(No Model.)
C. S. SCOTT.
CLUTCH.
No. 337,021. Patented Mar. 2, 1886.
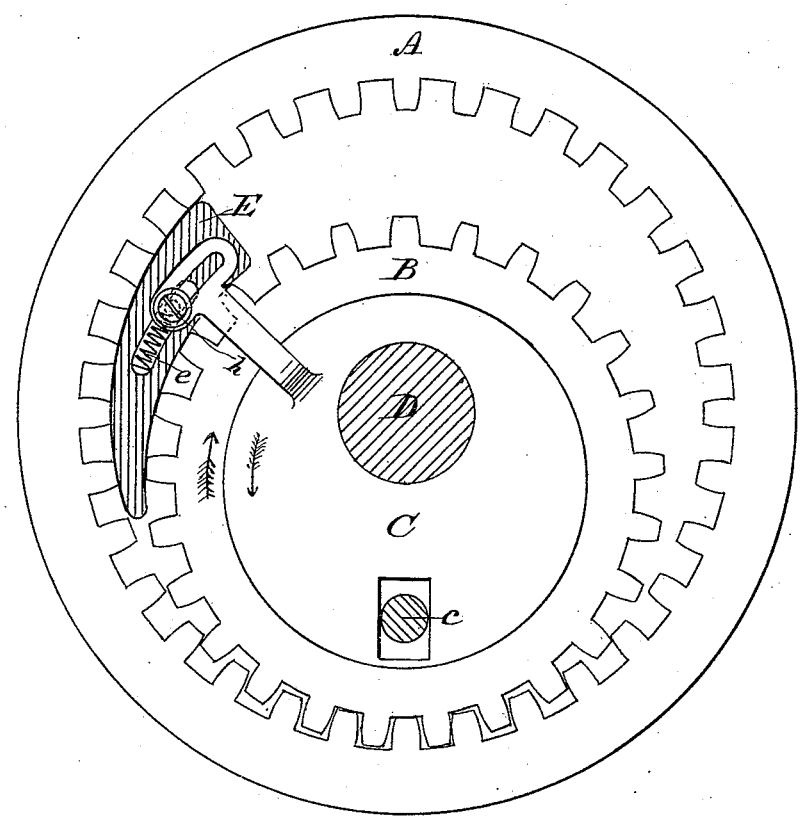
Witnesses:
T. C. Brecht
E. Pitts
Inventor:
Charles S. Scott

UNITED STATES PATENT OFFICE.

CHARLES S. SCOTT, OF CADIZ, OHIO.

CLUTCH.

SPECIFICATION forming part of Letters Patent No. 337,021, dated March 2, 1886.

Application filed December 21, 1885. Serial No. 186,338. (No model.)

*To all whom it may concern:*

Be it known that I, CHARLES S. SCOTT, a citizen of the United States, residing at Cadiz, in the county of Harrison and State of Ohio, have invented new and useful Improvements in Clutches; and I do hereby declare the following to be a full, clear, and exact description of the invention, such as will enable others skilled in the art to which it appertains to make and use the same.

My invention relates to mechanical clutches, not essentially a friction-clutch, as it does not depend entirely upon friction, but partly upon tooth-gearing.

The object is to provide a noiseless clutch that will catch more quickly, not slip in catching its grip or after it has caught, and especially I desire to provide a clutch that dirt and thick oil will not render ineffectual and useless, as is so common in noiseless or friction clutches.

The invention consists in placing a wheel within a wheel, said wheels of such difference in diameter as to permit of a clog being placed between them, substantially as hereinafter described.

The figure is a plan view of my entire clutch mechanism with all outer casing, drums, or treadles removed.

I have a wheel, A, geared inwardly to a wheel, B, the inner wheel running on a cam, C, which cam revolves about a shaft, D, said shaft concentric with the outer ring or wheel, A, and eccentric to inner wheel, B, and cam C. A circular wedge-shaped clog, E, is placed between the wheels and held in by a weak spring, $e$, or out by pin $h$. It is evident that the cam D revolving in the direction indicated by the arrow will revolve the wheel B, as similarly indicated, about the cam C. The clog E following, it is evident that this motion of the parts would continue; but when the cam C is reversed the wheel B runs upon the clog E and will lock the entire mechanism. The clog E may be placed anywhere between the point of contact of the two wheels and a point diametrically opposite thereto, and such clog may be of any desired length, so that it will retain a proper position and not make a noise sliding over the wheels.

A clutch similar in action to mine could be made with the inner wheel small enough to be entirely within the half-circle of the larger wheel; also, two external wheels may be locked in one direction by a clog; but I have found that neither of these plans will work successfully, except in very large wheels, where the peripheries will diverge very gradually from the tangential point. The clog E need not of necessity slide upon the tops of the teeth, as shown, since a recess may be turned partly from each series of teeth, so that said clog would lock against a smooth surface. This plan would be somewhat more susceptible to the influence of dirt and oil; hence I do not use it where great power and positive grip are desired, as in a clutch for a bicycle. The teeth can be made large in an internal gear and yet work smoothly; hence I place the clog as shown.

The simplicity of this clutch is a feature of the invention.

I have found great difficulty, and have noticed the difficulty with others, in providing a good silent clutch for a bicycle; hence I am inclined to believe my clutch to be a great improvement on any tried before, especially in bicycles, for which I expect to find it the most used.

The cam C is fixed to a treadle or operated by pin $c$.

Having described my invention, what I claim, and desire to secure by Letters Patent, is—

1. In a clutch, a wheel within a wheel eccentrically arranged, means for rotating the center of one about the center of the other, and a clog between the wheels, substantially as described.

2. In a clutch, the combination of an inwardly-toothed wheel, A, and externally-toothed wheel B, meshing together, the latter revolving about a cam, C, together with a clog, E, interposed between said wheels, and a spring, $e$, for keeping said clog in a locking position, substantially as described.

3. In a clutch, the clog E, interposed between two wheels, A and B, and means for holding said clog in position, substantially as described.

CHARLES S. SCOTT.

Witnesses:
R. P. SCOTT,
JNO. T. MADDOX.